US008606385B2

(12) United States Patent
Joly

(10) Patent No.: US 8,606,385 B2
(45) Date of Patent: Dec. 10, 2013

(54) METHOD FOR QUALITATIVE EVALUATION OF A DIGITAL AUDIO SIGNAL

(75) Inventor: Alexandre Joly, La Notte-Sercolex (FR)

(73) Assignee: Telediffusion de France, Paris (FR)

( * ) Notice: Subject to any disclaimer, the term of this patent is extended or adjusted under 35 U.S.C. 154(b) by 241 days.

(21) Appl. No.: 13/219,391

(22) Filed: Aug. 26, 2011

(65) Prior Publication Data

US 2012/0099734 A1 Apr. 26, 2012

Related U.S. Application Data

(62) Division of application No. 10/502,425, filed as application No. PCT/FR03/00222 on Jan. 23, 2003, now Pat. No. 8,036,765.

(30) Foreign Application Priority Data

Jan. 24, 2002 (FR) ...................................... 02 00856

(51) Int. Cl.
*G06F 17/00* (2006.01)

(52) U.S. Cl.
USPC ..................................... 700/94; 704/E19.002

(58) Field of Classification Search
USPC ..................................... 704/E19.002; 700/94
See application file for complete search history.

(56) References Cited

U.S. PATENT DOCUMENTS

| | | | | |
|---|---|---|---|---|
| 5,621,854 | A * | 4/1997 | Hollier | 704/200.1 |
| 5,991,611 | A * | 11/1999 | Palumbo | 455/219 |
| 6,628,737 | B1 * | 9/2003 | Timus | 375/368 |
| 7,006,555 | B1 * | 2/2006 | Srinivasan | 375/133 |

FOREIGN PATENT DOCUMENTS

| | | | |
|---|---|---|---|
| FR | 2 769 777 | A | 4/1999 |
| WO | WO-99 50824 | A | 10/1999 |
| WO | WO-00 00962 | A | 1/2000 |
| WO | WO-01 31816 | A1 | 5/2001 |
| WO | WO-01 52600 | A | 7/2001 |

OTHER PUBLICATIONS

Montard N. et al., "An efficient method for objective audio and video quality assessment in digital television applications"; Signal Processing X Theories and Applications, Sep. 2000, pp. 2189-2192, vol. 4, Tampere, Finland.

real-time, Computer Dictionary Online, Nov. 23, 1997, http://www.computer-dictionary-online.org/index.asp?q=real-time.

* cited by examiner

*Primary Examiner* — Joseph Saunders, Jr.

(74) *Attorney, Agent, or Firm* — Alston & Bird LLP

(57) ABSTRACT

The invention relates to a method of qualitatively evaluating a digital audio signal. It calculates a quality indicator consisting of a vector associated with each time window in real time, in continuous time, and in successive time windows. For example, the generation of a quality indicator vector calculates, for a reference audio signal and for an audio signal to be evaluated, the spectral power density of the audio signal, the coefficients of a prediction filter, using an autoregressive method, a temporal activity of the signal or the minimum value of the spectrum in successive blocks of the signal. To evaluate the deterioration of the audio signal, the method may calculate a distance between the vectors of the reference audio signal and the audio signal to be evaluated associated with each time window.

10 Claims, 7 Drawing Sheets

METHOD FOR QUALITATIVE EVALUATION OF A DIGITAL AUDIO SIGNAL

CROSS-REFERENCE TO RELATED APPLICATIONS

This application claims the benefit of International Patent Application No. PCT/FR03/00222, filed Jan. 23, 2003, and U.S. patent application Ser. No. 10/502,425, filed Jan. 25, 2005, both of which are incorporated herein by reference in their entireties.

The present invention consists in a method of evaluating a digital audio signal, such as a signal transmitted digitally and/or a digital signal to which digital coding, in particular bit rate reduction coding, and/or decoding has been applied. A signal transmitted digitally may be an independent audio signal (as in the case of radio broadcasting) or an audio signal that accompanies a program such as an audiovisual program.

BACKGROUND OF THE INVENTION

The field of digital broadcasting and digital mobile radio is expanding fast, in particular following the introduction of digital television and mobile telephones. In order to be able to provide a quality assured service, new instruments need to be developed for measuring the quality of all the systems necessary for the deployment of this technology.

Subjective tests are used for this purpose that evaluate the quality of sound signals by having experts or novices listen to them. This method is time-consuming and costly, because many strict conditions must be complied with for such tests (choice of panelists, listening conditions, test sequences, test chronology, etc.). It nevertheless yields databases consisting of reference signals and the scores assigned to them. These tests yield Mean Opinion Scores (MOS) that are recognized as the benchmark in the area of quality estimation.

Many studies of the human hearing system have been carried out with the aim of minimizing the number of subjective tests. Based on this work, models of the ear and of psychoacoustic phenomena have been developed and have been used to analyze sound signals and to estimate their quality using objective methods. The quality measured is the quality as perceived by the human ear, and is therefore referred to as the objective perceived quality.

It is possible to distinguish three classes of objective test methods: the first of these classes is the "complete reference" class in which the original signal is compared directly with the degraded signal (i.e. the signal after coding, broadcasting, multiplexing, etc.); the second class is the "reduced reference" class in which only parameters extracted from the two signals are compared; in the third class, defects generated by the broadcasting system are detected using their known main characteristics, and this circumvents the constraints associated with the use of a reference signal (in all other cases, the reference must be transmitted to the place of comparison and then synchronized precisely with the degraded signal, which makes the system complex and more costly).

Degradation by transmission errors significantly reduces the quality of the signal and occurs when broadcasting an MPEG digital stream, for example, or when broadcasting via the Internet, especially in the case of radio broadcasts.

In this context, it is desirable to have a method of objectively measuring the quality of a broadcast audio signal either without using a reference signal at all or using a "reduced" reference signal, for example because only these methods are suitable for monitoring a broadcast network where a plurality of remote measuring points may be necessary. It is also beneficial to exploit the relative simplicity of this kind of method for measuring the quality of a digital audio signal that has been subjected to digital coding, in particular with bit rate reduction, and/or decoding, whether the signal has been transmitted or not.

The number of audio quality measuring methods that have been developed varies widely from one class to another. A large number of complete reference methods have been developed, but only a few reduced reference methods or methods that do not use a reference.

Complete reference methods, which compare the signal to be evaluated with a reference signal, comprise the standard techniques used to estimate the quality of radio coders, for example. Their general principle is to use a perceptual model of human hearing to calculate internal representations of the original signal and the degraded signal and then to compare these two internal representations. One example of a method of this kind is described in the paper by JOHN G. BEERENDS and JAN A. STEMERDINK, "A Perceptual Audio Quality Measure Based on a Psychoacoustic Sound Representation", published in "Journal of the Audio Engineering Society", Vol. 12, December 1992, pages 963 to 978.

In order to obtain a representation that is as faithful as possible, these hearing models are based on masking experiments and must make it possible to predict whether the deterioration will be audible or not, since not all deterioration of a signal is audible or a nuisance. Perceptual models using a reference are based on the FIG. 1 diagram, and many methods of varying sophistication rely on this principle. The PErceived Audio Quality (PEAQ) algorithm was recently standardized by the ITU-R in Standard BS.1387. This algorithm is based on the standard principles and combines them with a quality prediction model using a neural network.

Although it must be remembered that they were designed for evaluating the impact of coding, the major benefit of these techniques is the ability to detect very slight deterioration. The measurements obtained are relative in that only differences are taken into account in this type of measurement. In the case of a coder of very high quality, a seriously degraded signal will be coded and then decoded almost transparently, and a very high score will therefore be assigned. Moreover, the score could be low for a signal that has been modified (equalized, colored, etc.) between the step of calculating the reference and the comparison step, even if the perceived quality of the two signals is very high.

There are as yet few methods that do not use a reference. The Output-Based objective speech Quality (OBQ) method is the most highly developed of the "no reference" methods. It is a method of estimating the quality of a speech signal alone, with no reference signal, and is based on calculating perceptual parameters representing the content of the signal, combined into a vector. Vectors calculated for non-degraded signals constitute a reference database. Quality is estimated by comparing the same parameters obtained from degraded signals with vectors from the reference database. The main method using neural networks is the Objective Scaling of Sound Quality And Reproduction (OSSQAR) method. The general principle of this method is to use a hearing model and a neural network conjointly. To simulate psychoacoustic phenomena, the network predicts the subjective quality of the signal from a perceptual representation of the signal calculated using the hearing model. Note that the results obtained with these methods are much better if the signals are part of the training database, or at least if they have similar characteristics.

Thus these methods are not suitable for evaluating the quality of all signals, for example radio or TV broadcast audio signals.

As indicated above, most objective perceptual measurement algorithms using a complete reference operate in accordance with the same principle; they compare the degraded sound signal and the original signal (i.e. the signal before transmission and/or coding and/or decoding, called the reference signal). These algorithms therefore require a reference signal, which must additionally be synchronized very accurately with the signal under test. These conditions can only be satisfied in simulation or during tests on coders and other "compact" systems or systems that are not geographically distributed; in contrast, the situation is very different when receiving a signal broadcast from send antennas $A_1$ and receive antennas $A_2$ (see FIG. 2).

The reference signal must be available at the comparison points. The only option for using a complete reference method is to transmit the reference to the comparison points without errors and then to synchronize it perfectly. These complete reference methods are not applicable in practice, for reasons of spectral congestion, and therefore of cost, as they would necessitate the use of a transparent second transmission channel.

The methods with no reference that have been proposed may yield good results, but only with signals having known characteristics modeled during the training phase. Methods with no reference do not work well on any signal.

Using a "reduced" reference, in which the reference audio signal is characterized by one or more numbers, has been suggested. A method of this kind is described in French Patent Application FR 2 769 777 filed 13 Oct. 1997. However, this method is not able to process all the samples, in particular because the bit rate of the proposed reference signal (which is at least 36 kbit/s for windows comprising 1024 signal samples) is too high to satisfy the practical constraints on installation and implementation in a broadcast network.

OBJECTS AND SUMMARY OF THE INVENTION

The present invention proposes a method whereby the indicators are simpler and may be calculated in real time and in continuous time and require a much lower bit rate. The deterioration may modify only a few samples, even though it seriously degrades quality, and the proposed method enables the entire audio stream to be analyzed.

The method of the invention provides a reliable estimate of the quality of an audio signal that has been transmitted or coded digitally, since disturbances affecting the transmission channels may induce errors in the data transmitted that are reflected in a degraded final audio signal.

The technological approach proposed consists in effecting one measurement of the audio signal at the input of the system under test and another at the output. Comparing these measurements verifies that the transmission channel is "transparent" and evaluates the magnitude of the deterioration that has been introduced.

By detecting deterioration on the basis of the signatures of the characteristics of the more serious defects to be identified, the proposed approach reliably estimates the deterioration introduced, whether it is used in conjunction with methods that use no reference or not. It further alleviates the lack of a reference signal. In the case of reduced reference measurements, this method reduces the reference bit rate necessary for estimating quality, and in the case of measurements with no reference it reduces the number of parameters that have to be used.

Thus the invention provides a method of evaluating a digital audio signal, comprising calculating, in real time, in continuous time, and in successive time windows, a quality indicator which consists, for each time window, of a vector whose dimension is advantageously at least one hundred times smaller than the number of audio samples in a time window. This dimension is from 1 to 10, for example, and preferably from 1 to 5.

The digital audio signal to be evaluated may have been transmitted digitally and/or subjected to digital coding, in particular with bit rate reduction, starting from a reference digital signal.

In a first variant, using a perceptual count difference, the generation of a quality indicator vector employs the following steps for a reference audio signal and for the audio signal to be evaluated:

a) calculating for each time window the spectral power density of the audio signal and applying to it a filter representative of the attenuation of the inner and middle ear to obtain a filtered spectral density, b) calculating individual excitations from the filtered spectral density using the frequency spreading function of the basilar scale, c) determining the compressed loudness from said individual excitations using a function modeling the non-linear frequency sensitivity of the ear, to obtain basilar components, d) separating the basilar components into classes, preferably into three classes, and calculating for each class a number C representing the sum of the frequencies of that class, said vector consisting of said numbers C, and e) calculating a distance between the vectors of the reference audio signal and the audio signal to be evaluated associated with each time window to evaluate the deterioration of the audio signal.

In a second variant, using autoregressive modeling of the audio signal, the generation of a quality indicator vector employs the following steps for the reference audio signal and for the audio signal to be evaluated:

a) calculating N coefficients of a prediction filter by autoregressive modeling, b) determining in each time window the maximum of the prediction residue as a difference between the signal predicted with the aid of the prediction filter and the audio signal, said maximum of the prediction residue constituting said quality indicator vector, and c) calculating a distance between said vectors of the reference audio signal and the audio signal to be evaluated associated with each time window to evaluate the deterioration of the audio signal.

In a third variant, using autoregressive modeling of the basilar excitation, the generation of a quality indicator vector employs the following steps for the reference audio signal and for the audio signal to be evaluated:

a) calculating for each time window the spectral power density of the audio signal and applying to it a filter representative of the attenuation of the inner and middle ear to obtain a frequency spreading function in the basilar scale, b) calculating individual excitations from the frequency spreading function in the basilar scale, c) obtaining the compressed loudness from said individual excitations using a function modeling the non-linear frequency sensitivity of the ear, to obtain basilar components, d) calculating N' prediction coefficients of a prediction filter from said basilar components by autoregressive modeling, and e) generating for each time window a quality indicator vector from only some of the N' prediction coefficients.

The quality indicator vector preferably comprises from 5 to 10 of said prediction coefficients.

In a fourth variant, using detection of flats in the activity of the signal, the generation of a quality indicator vector employs the following steps for at least the audio signal to be evaluated:

a) calculating a temporal activity of the signal in each time window, b) calculating a sliding average over $N_1$ successive values of the temporal activity, and c) retaining the minimum value of $M_1$ successive values of the sliding average.

The quality indicator vector may consist of said minimum value, or a binary value that is the result of comparing said minimum value with a given threshold. The method may equally calculate a quality score by determining a cumulative time interval during which said minimum value is below a given threshold $S_1$ and/or by determining the number of times per second said minimum value is below a given threshold $S'_1$, or said minimum values are generated at the same time for the reference audio signal and for the audio signal to be evaluated and a quality vector is generated by comparing the corresponding minimum values for the reference audio signal and for the audio signal to be evaluated, for example by calculating the difference or the ratio between said minimum values.

In a fifth variant, using detection of peaks in the activity of the audio signal, the generation of a quality indicator vector employs the following steps for at least the audio signal to be evaluated:

a) calculating a temporal activity of the signal in each time window, b) calculating a sliding average over $N_2$ successive values of the temporal activity, and c) retaining the maximum value from $M_2$ successive values of the sliding average.

The quality indicator vector may consist of said maximum value or a binary value resulting from comparing said maximum value with a given threshold.

In the method, a deterioration indicator may be generated by comparing the maximum value obtained for the reference audio signal and the corresponding maximum value obtained for the audio signal to be evaluated, for example by calculating the difference or the ratio between the maximum values.

In a sixth variant, using calculation of the minimum of the spectrum of the audio signal, the generation of a quality indicator vector calculates, at least for the audio signal to be evaluated, the Fourier transform in successive blocks of $N_3$ samples constituting said time windows and the minimum of the spectrum in $M_3$ successive blocks that constitute a quality indicator vector.

The method may include a step of evaluating the introduction of noise into the audio signal to be evaluated by comparing the value of said minimum value of the spectrum in $M_3$ successive blocks associated with the audio signal to be evaluated and the maximum value of the $M_3$ minima obtained in the same $M_3$ successive blocks associated with the reference audio signal.

It may equally include a step of evaluating the introduction of noise into the audio signal to be evaluated by comparing the value of said minimum of the spectrum in $M_3$ successive blocks with an average value of the minima of the spectrum obtained in blocks anterior to the $M_3$ successive blocks, for example by calculating the difference or the ratio between the average values.

In a seventh variant, using estimation of the flattening of the spectrum of the audio signal, the generation of a quality indicator vector calculates, at least for the audio signal to be evaluated, a spectrum flattening parameter that is the ratio between an arithmetical mean and a geometrical mean of the components of the spectrum of the signal.

The method may then use an indicator of detection of deterioration of the audio signal by the introduction of wideband noise by comparing said spectrum flattening parameter between the reference audio signal and the audio signal to be evaluated, for example by calculating the difference or the ratio between the two parameters.

BRIEF DESCRIPTION OF THE DRAWINGS

Other features and advantages of the invention will become more clearly apparent on reading the following description, which is given with reference to the drawings, in which.

MORE DETAILED DESCRIPTION

Figure 1:
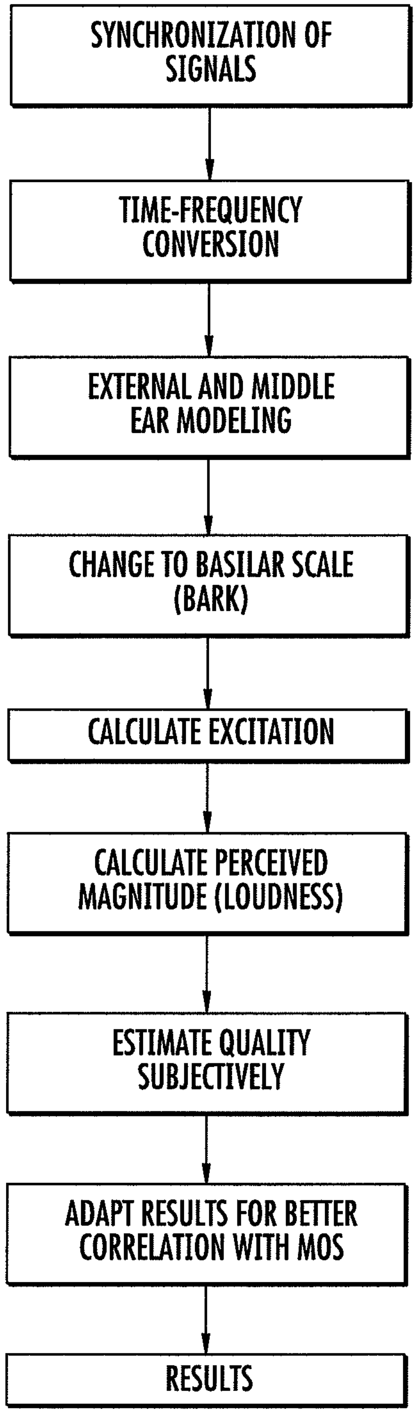
FIG. 1 is a flowchart showing a complete reference quality evaluation process.
Figure 2:
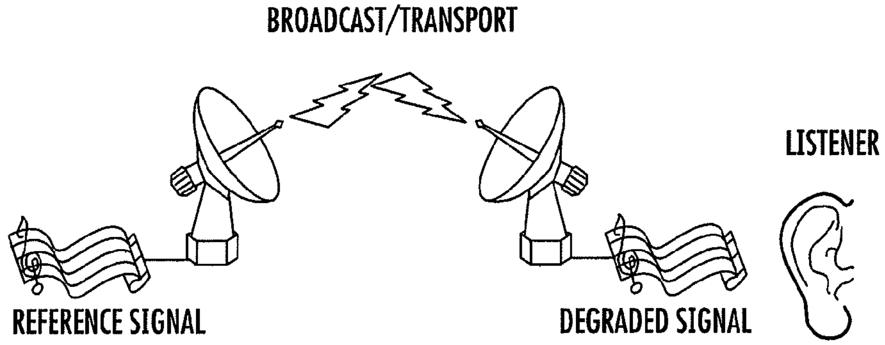
FIG. 2 depicts audio transmission with loss of quality.

The management and recovery of decoding errors are not standardized. The impact of these errors on perceived quality therefore depends on the code used.

The audibility of these defects is also related to the type of elements in the frame affected, for example MPEG elements, and its audio content.

In the case of serious transmission errors, signal quality is greatly degraded. This degradation occurs during the broadcasting of an MPEG digital stream, for example, and is usually impulsive. It may also occur when broadcasting an audio stream over the Internet or during coding or decoding.

For this type of defect, quality may be estimated in a binary fashion; either the signal has not been degraded, and its quality depends on the initial coding used, or errors have been introduced, and the signal has been seriously degraded.

Quality may then be estimated using methods that use no reference, by calculating the deterioration detected at regular time intervals of the order of one second, for example. Subjective tests have yielded a reliable estimate of perceived quality based on the number and length of interruptions related to an impulsively degraded signal.

The reduced reference measurement method proposed reduces the bit rate necessary for conveying the reference. This authorizes the use of channels reserved for a relatively limited bit rate. These measurements are used to detect forms of deterioration other than that caused by transmission errors.

Thus the present invention provides bit rate reduction in the case of reduced reference measurements and, by adding simple measurements with no reference, retains measurement of serious deterioration in the event of loss of the reference, for example, by locally generating a vector that simply characterizes the deterioration and which can therefore be easily processed and transmitted to a control installation, in particular to a centralized installation.

The measurements effected along the system and at various points of the network inform the digital television broadcasting monitoring and management system of the overall performance of the network. The measured signal deterioration informs the broadcast operator of the quality of service delivered.

The method is characterized by two complementary modes of operation:

Reduced reference mode: The technological approach proposed consists in effecting one measurement on the audio signal at the input of the transmission system or other system under test (coder, decoder, etc.) and another at the output. Comparing these measurements verifies the "transparency" of the system and evaluates the magnitude of the deterioration that has been introduced. Unlike the prior art technique:

- the evaluation is in real time and in continuous time,
- the reference measurements at the input of the system represent a very small quantity of data relative to the data of the audio signal, which explains the designation "reduced reference", and
- the reference data or measurements used are also a reduced representation of the content of the signal as well as a measurement of the magnitude of a type of deterioration.

The invention alleviates the lack of a reference signal. To this end, the method defines measurements for the characteristic digital defects to be identified. Unlike the prior art, the approach proposed is able to estimate the deterioration of any signal reliably, and this approach may be applied equally well at the level of an entire transmission network or locally at the level of an equipment. Moreover, the complexity of the calculations for this method is low, and the indicator obtained represents a small quantity of data compared to the digital audio stream.

Finally, the method may be applied indifferently to purely digital signals and to signals that have been subjected to digital-to-analogue conversion followed by analogue-to-digital conversion after transmission.

The first three methods described hereinafter are "reduced reference" methods.

To obtain a more accurate quality estimate, certain of the parameters developed use perceptual modeling; the theory of objective perceptual measurements is based on the transformation of a physical representation (sound pressure level, level, time, and frequency) into a psychoacoustic representation (sound strength, masking level, critical times and bands or barks) of two signals (the reference signal and the signal to be evaluated), in order to compare them. This conversion is effected by means of a model of the human hearing apparatus (this modeling generally consists in a spectrum analysis of barks followed by spreading phenomena). A distance between the psychoacoustic representations of the two signals may then be calculated, and may be related to the quality of the signal to be evaluated (the shorter the distance, the closer the signal to be evaluated to the original signal and the better its quality).

The first method uses a "perceptual counting error" parameter.

To take account of psychoacoustic factors, this parameter is calculated in several steps. These steps are applied to the reference signal and to the degraded signal. They are as follows:

Time windowing of the signal in blocks and then, for each of the blocks, calculating the excitation induced by the signal, using a hearing model. This representation of the signals takes account of psychoacoustic phenomena and generates a histogram whose counts are the values of the basilar components. This limits the amount of useful information by ignoring everything except the audio components of the signal. To obtain this excitation, standard modeling techniques may be used, such as attenuation of the external and middle ear, integration in critical bands, and frequency masking. The time windows chosen are of approximately 42 ms duration (2048 points at 48 kHz), with a 50% overlap. This achieves a time resolution of the order of 21 ms.

This modeling requires several steps. For the first step, the external and middle ear attenuation filter is applied to the spectral power density obtained from the spectrum of the signal. This filter also takes into account the absolute hearing threshold. The concept of critical bands is modeled by converting from a frequency scale to a basilar scale. The next step corresponds to calculating individual excitations to take account of masking phenomena, using the frequency spreading function of the basilar scale and non-linear addition. By means of a power function, the last step yields the compressed loudness, used for modeling the non-linear frequency sensitivity of the ear by means of a histogram comprising the 109 basilar components.

The counts of the histogram obtained are then grouped into three classes. This vectorization yields a visual representation of the evolution of the structure of the signals and a simple and concise characterization of the signal and thus a reference parameter that is of particular benefit.

There are several strategies for fixing the boundaries of these three counts; the simplest separates the histogram into three areas of equal size. Thus the 109 basilar components (or the 24 components that constitute the excitation and provide a simplified representation of it) represent 24 Barks and may be separated at the following indices:

$$S_1 = 36, \text{ i.e. } z = \frac{24}{109} * 36 = 7.927 \text{ Barks} \tag{1}$$

$$S_2 = 73, \text{ i.e. } z = \frac{24}{109} * 73 = 16.073 \text{ Barks} \tag{2}$$

The second strategy takes into account the Beerends scaling areas. In fact, the gain between the excitation of the reference signal and that of the signal under test is compensated by ear. The limits set are then as follows:

$$S_1 = 9, \text{ i.e. } z = \frac{24}{109} * 9 = 1.982 \text{ Barks} \tag{3}$$

$$S_2 = 100, \text{ i.e. } z = \frac{24}{109} * 100 = 22.018 \text{ Barks} \tag{4}$$

The trajectory is then represented in a triangle called the triangle of frequencies. Three counts $C_1$, $C_2$ and $C_3$ are obtained for each block, and therefore two Cartesian coordinates, satisfying the following equations:

$$X = C_1/N + \frac{C_2/N}{2} \tag{5}$$

$$Y = C_2/N * \sin(\pi/3) \tag{6}$$

in which:

$C_1$ is the sum of the basilar excitations for the high frequencies (components above $S_2$), $C_2$ is the count associated with the medium frequencies (components between $S_1$ and $S_2$), and $N=C_1+C_2+C_3$ is the total sum of the values of the components.

Figure 3:
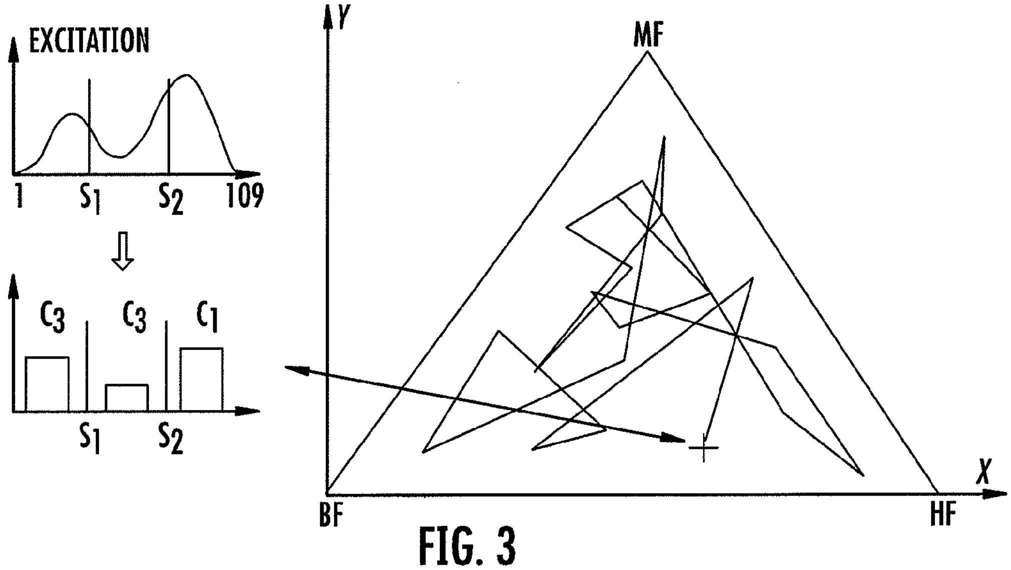
FIGS. 3 to 10 represent evaluation methods of the present invention.

A point (X, Y) constituting a vector is therefore obtained for each time window of the signal, which corresponds to the transmission of two values per window of 1024 bits, for example, i.e. a bit rate of 3 kbit/s for an audio signal sampled at 48 kHz. The representation for a complete sequence is therefore a trajectory parameterized by time, as shown in FIG. 3.

The Euclidean distance between the reference signal and the degraded signal is then calculated. In the case of continuous estimation of quality, the distance between the points provides an estimate of the magnitude of the deterioration introduced between the reference signal and the degraded signal. Because psychoacoustic models are used, this distance may be regarded as a perceived distance.

To estimate a quality score for a signal of several seconds duration, it is possible to calculate a global measurement of the difference between the two signals. Several metrics can be used for this. They may be of the diffuse type (average distance between peaks, intercepted area, etc.) or the local type (maximum and minimum distances between peaks, etc.), and depend on the position within the triangle.

It is also possible to take account of just noticeable differences. These are thresholds that determine the audibility of the differences that have occurred. To take account of the variability of the masking phenomena, they may be modeled by tolerance areas as a function of position in the triangle.

In all cases, the two trajectories must be synchronized first.

Figure 4:
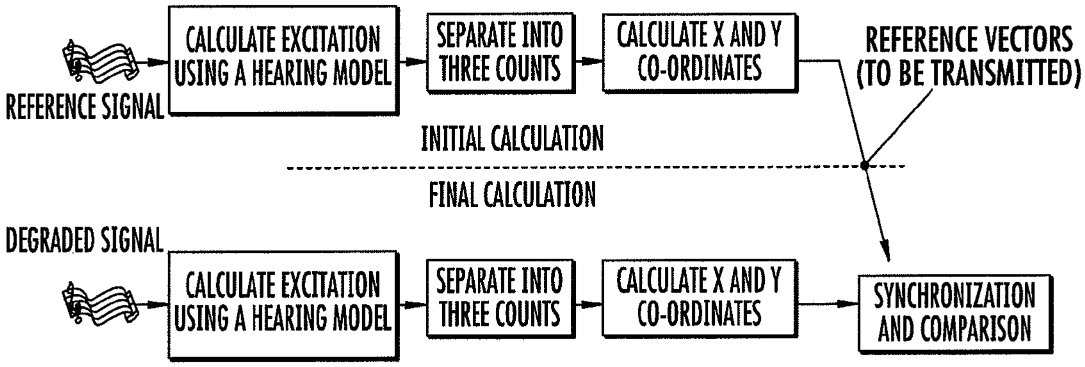

Thus the principle of calculating this comparative parameter may be summarized in the manner of the FIG. 4 diagram.

The main advantage of this parameter is that it takes account of psychoacoustic phenomena without increasing the bit rate necessary to transfer the reference. In this way the reference for 1024 signal samples may be reduced to two values (3 kbit/s).

The second method used autoregressive modeling of the signal.

The general principle of linear prediction is to model a signal as a combination of its past values. The basic idea is to calculate the N coefficients of a prediction filter by autoregressive (all pole) modeling. It is possible to obtain a predicted signal from the real signal using this adaptive filter. The prediction or residual errors are calculated from the difference between these two signals. The presence and the quantity of noise in a signal may be determined by analyzing these residues.

The magnitude of the modifications and defects introduced may be estimated by comparing the residues obtained for the reference signal and those calculated from the degraded signal.

Because there is no benefit in transmitting all of the residues if the bit rate of the reference is to be reduced, the reference to be transmitted corresponds to the maximum of the residues over a time window of given size.

Two methods of adapting the coefficients of the prediction filter are described hereinafter by way of example:

The LEVINSON-DURBIN algorithm, which is described, for example, in "Traitement numérique du signal—Théorie et pratique" ["Digital signal processing—Theory and practice"] by M. BELLANGER, MASSON, 1987, pp. 393 to 395. To use this algorithm, an estimate is required of the autocorrelation of the signal over a set of $N_0$ samples. This autocorrelation is used to solve the Yule-Walker system of equations and thus to obtain the coefficients of the prediction filter. Only the first N values of the autocorrelation function may be used, where N designates the order of the algorithm, i.e. the number of coefficients of the filter. The maximum prediction error is retained over a window comprising 1024 samples.

The gradient algorithm, which is also described in the above-mentioned book by M. BELLANGER, for example, starting at page 371. The main drawback of the preceding parameter is the necessity, in the case of a DSP implementation, to store the $N_0$ samples in order to estimate the autocorrelation, together with the coefficients of the filter, and then to calculate the residues. The second parameter avoids this by using another algorithm to calculate the coefficients of the filter, namely the gradient algorithm, which uses the error that has occurred to update the coefficients. The coefficients of the filter are modified in the direction of the gradient of the instantaneous quadratic error, with the opposite sign.

When the residues have been obtained from the difference between the predicted signal and the real signal, only the maximum of their absolute values over a time window of given size T is retained. The reference vector to be transmitted can therefore be reduced to a single number.

After transmission followed by synchronization, comparison consists in simply calculating the distance between the maxima of the reference and the degraded signal, for example using a difference method.

Figure 5:
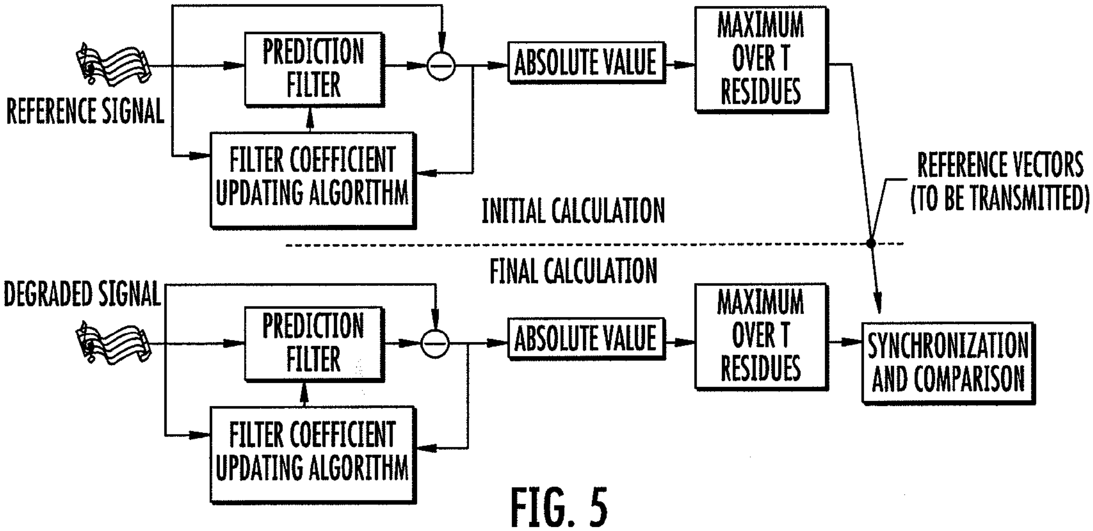

FIG. 5 summarizes the parameter calculation principle:

The main advantage of the two parameters is the bit rate necessary for transferring the reference. This reduces the reference to one real number for 1024 signal samples.

However, no account is taken of any psychoacoustic model.

The third method uses autoregressive modeling of the basilar excitation.

In contrast to the standard linear prediction method, this method takes account of psychoacoustic phenomena in order to obtain an evaluation of perceived quality. For this purpose, calculating the parameter entails modeling diverse hearing principles. Linear prediction models the signal as a combination of its past values. Analysis of the residues (or prediction errors) determines the presence of noise in a signal and estimates the noise. The major drawback of these techniques is that they take no account of psychoacoustic principles. Thus it is not possible to estimate the quantity of noise actually perceived.

The method uses the same general principle as standard linear prediction and additionally integrates psychoacoustic phenomena in order to adapt to the non-linear sensitivity of the human ear in terms of frequency (pitch) and intensity (loudness).

The spectrum of the signal is modified by means of a hearing model before calculating the linear prediction coefficients by autoregressive (all pole) modeling. The coefficients obtained in this way provide a simple way to model the signal taking account of psychoacoustics. It is these prediction coefficients that are sent and used as a reference for comparison with the degraded signal.

The first part of the calculation of this parameter models psychoacoustic principles using the standard hearing models. The second part calculates linear prediction coefficients. The final part compares the prediction coefficients calculated for the reference signal and those obtained from the degraded signal. The various steps of this method are therefore as follows:

Time windowing of the signal followed by calculation of an internal representation of the signal by modeling psychoacoustic phenomena. This step corresponds to the calculation of the compressed loudness, which is in fact the excitation in the inner ear induced by the signal. This representation of the signal takes account of psychoacoustic phenomena and is obtained from the spectrum of the signal, using the standard form of modeling: attenuation of the external and middle ear, integration in critical bands, and frequency masking; this step of the calculation is identical to the parameter described above;

Autoregressive modeling of the compressed loudness in order to obtain the coefficients of an RIF prediction filter, exactly as in standard linear prediction; the method used is that of autocorrelation by solving the Yule-Walker equations; the first step for obtaining the prediction coefficients is therefore calculating the autocorrelation of the signal.

It is possible to calculate the perceived autocorrelation of the signal using an inverse Fourier transform by considering the compressed loudness as a filtered spectral power.

One method of solving the Yule-Walker system of equations and thus of obtaining the coefficients of a prediction filter uses the Levinson-Durbin algorithm.

It is the prediction coefficients that constitute the reference vector to be sent to the comparison point. The transforms used for the final calculations on the degraded signal are the same as are used for the initial calculations applied to the reference signal.

Estimating the deterioration by calculating a distance between the vectors from the reference and from the degraded signal. This compares coefficient vectors obtained for the reference and for the transmitted audio signal, enabling the deterioration caused by transmission to be estimated, using an appropriate number of coefficients. The higher this number, the more accurate the calculations, but the greater the bit rate necessary for transmitting the reference. A plurality of distances may be used to compare the coefficient vectors. The relative size of the coefficients may be taken into account, for example.

Figure 6:
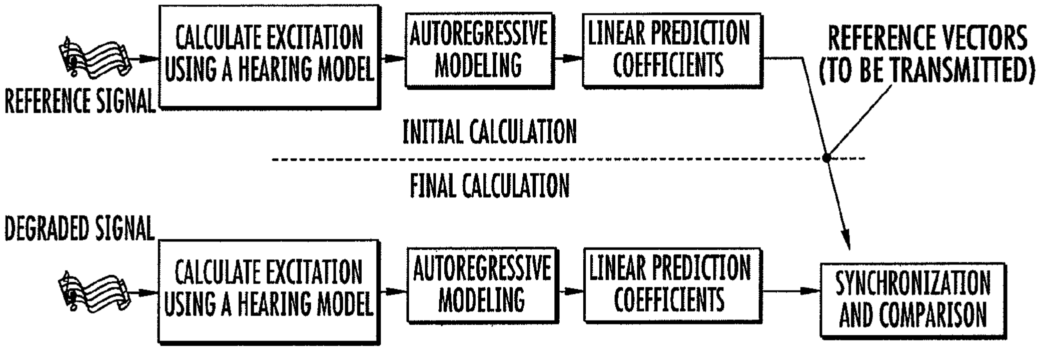

The principle of the method may be as summarized in the FIG. 6 diagram.

Modeling psychoacoustic phenomena yields 24 basilar components. The order N of the prediction filter is 32. From these components, 32 autocorrelation coefficients are estimated, yielding 32 prediction coefficients, of which only 5 to 10 are retained as a quality indicator vector, for example the first 5 to 10 coefficients.

The main advantage of this parameter is that it takes account of psychoacoustic phenomena. To this end, it has been necessary to increase the bit rate needed to transfer the reference consisting of 5 or 10 values for 1024 signal samples (21 ms for an audio signal sampled at 48 kHz), that is to say a bit rate of 7.5 to 15 kbit/s.

The following methods may be used with or without a reference. This means that the measurements for detecting more serious deterioration are retained, even if no reference parameter is available at the control point at the time when the comparison must be effected.

The first of these methods uses detection of flats in the activity of the signal.

The notion of activity, which may be approximated by differentiating the audio signal, is used to identify breaks and interruptions in the temporal signal.

These types of error are characteristic of coding errors after transmitting a digital audio stream or broadcasting sound sequences over the Internet. They occur when the bit rate of the network is too low to ensure the arrival of all the necessary frames by the time for decoding, for example.

These forms of deterioration, which introduce areas of very low activity, are reflected in different auditory sensations for the hearer: breaks in the sound, blurred sound, impulsive noise, etc.

The first step of calculating the parameter is estimating the temporal activity of the signal. To this end, a second derivative operator is used. It provides a sufficiently precise estimate of activity and requires only a very few calculations.

The following formula, in which f(t) corresponds to the value of the sample at time t, is a simple way to simulate this second derivative operator:

$$f''(x_0)=f(x_0+2)-2\cdot f(x_0)+f(x_0-2) \quad (7)$$

or $$f''(x_0)=f(x_0+1)-2\cdot f(x_0)+f(x_0-1) \quad (8)$$

A sliding average over N values is then used to smooth the variations in the curve obtained and thus to prevent false detection (for example N=21, which corresponds to 0.5 ms for a sampling frequency of 48 kHz). Only one result is retained per block of M results (M corresponds to 2048 audio samples, for example). The minimum of the M averages is retained and transmitted. The parameter is therefore obtained at time t from the following formula, in which y(t) corresponds to the activity:

$$\text{Flats}(t) = \min_{k\in M}\left(\frac{1}{N}\sum_{i\in N}|y(t-k-i)|\right) \quad (9)$$

If the parameter is used with a reference, after synchronizing the data, the comparison step is a simple difference operation that identifies areas in which the signal has been replaced by decoding flats. Only times at which the activity of the degraded signal is greatly reduced are of interest. Thus the comparison formula is as follows, where $\text{Flats}_f(t)$ and $\text{Flats}_d(t)$ are respectively the parameter calculated for the reference and the parameter calculated for the degraded signal:

$$d(t)=\max(0,\text{Flats}_f(t)-\text{Flats}_d(t)) \quad (10)$$

To reduce further the bit rate necessary for transporting the reference, it is also possible to compare the parameter Flats(t) calculated from the signal with a threshold S and thus to obtain a binary parameter. The drop in activity in the event of deterioration is in fact sufficiently great to be detected in this way.

In this case, comparison serves only to confirm the presence of deterioration. Thus no confusion is possible between areas of silence and areas of weak activity of the signal. Using the parameter with no reference nevertheless identifies the deterioration.

The psychoacoustic magnitude of the deterioration detected must be analyzed to proceed from detecting deterioration to estimating a perceived quality score. The perceived deterioration may vary greatly according to its length and the number of occurrences.

The next step therefore uses correspondence curves based on the binary parameter. These curves yield a quality score from the cumulative length of the impulsive deterioration and the number detected per second. These curves are established from subjective tests. Difference curves may be established as a function of the audio signal type (mainly speech or music). Once the estimate has been obtained, it is equally possible to use a filter for simulating the response of a panel member.

This takes account of the dynamic effect of the votes and the time to react to the deterioration.

Figure 7:
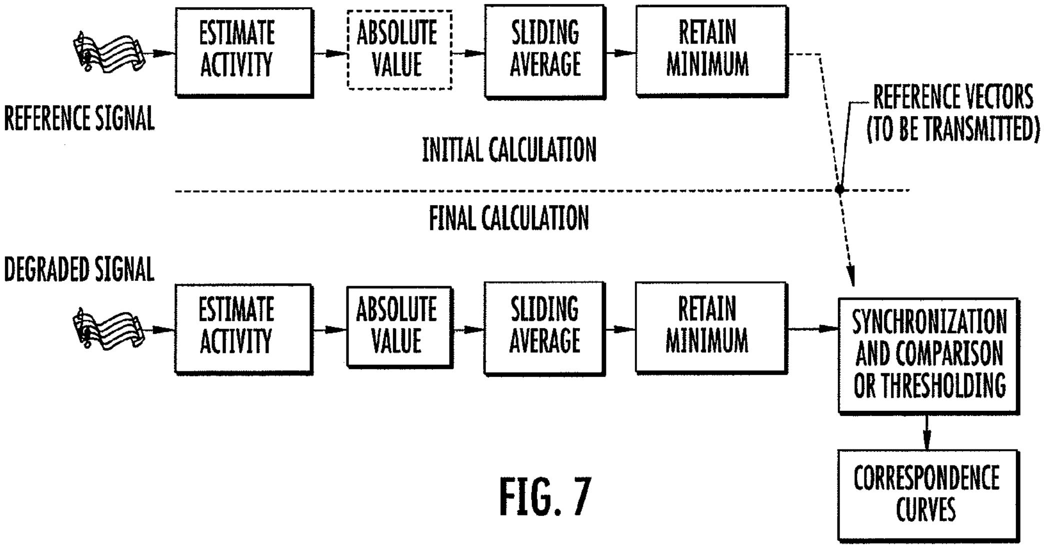

The FIG. 7 diagram summarizes the parameter.

The main advantage of this parameter is being able to effect measurements with no reference. Another benefit is the bit rate needed to transfer the reference, which reduces the reference to one real number, i.e. a bit rate of 1.5 kbit/s for 1024 signal samples (or even reduces it to one bit if a threshold is used, that is to say a bit rate of 47 bit/s). Note also that the algorithm is very simple and of reduced complexity and may therefore be installed in parallel with other parameters.

The second method uses activity peak detection.

This parameter, just like the preceding one, is based on the activity of the signal. It detects loss of synchronization, breaks in the audio signal, cutting off of a portion of the audio signal and aberrant samples by looking for peaks in the activity of the signal.

Accordingly, this time, only the maxima for blocks of M samples are retained. There is no benefit in transmitting and then comparing all of the activity values if the objective is mainly to obtain a reduced reference method.

The parameter is therefore obtained at the time t from the following formula, in which y(t) is the activity of the signal calculated by the filter:

$$ActTemp(t) = \max_{k \in M}(y(t-k)) \tag{11}$$

In the case of a method using a reference, the same calculation is effected on the reference signal and on the degraded signal.

After synchronizing the two streams, comparing these activity maxima detects areas in which the signal has been disturbed.

To make this comparison, the ratio between the value measured for the reference and that obtained from the degraded signal shows up deterioration. It is possible to detect areas in which activity has been greatly reduced by choosing the maximum of the ratio and its inverse.

The following formula is used, in which $ActTemp_r(t)$ and $ActTemp_d(t)$ are respectively the parameter calculated for the reference and the parameter calculated from the degraded signal:

$$d(t) = \max\left\{\frac{ActTemp_d(t)}{ActTemp_r(t)}, \frac{ActTemp_r(t)}{ActTemp_d(t)}\right\} \tag{12}$$

If the reference is not available, it is possible to use a threshold S' and to detect if the parameter is above the threshold, which indicates the presence of deterioration. To prevent false detection caused by impulsive signals (sharp attack, percussive components), the threshold must have a relatively high value, which may lead to failure of detection.

As in the preceding situation, correspondence curves may be used to estimate perceived quality. The method consists in integrating the deterioration detected by this parameter with other deterioration found using the preceding parameter, for example, and thereby to obtain a perceived global estimate.

Figure 8:
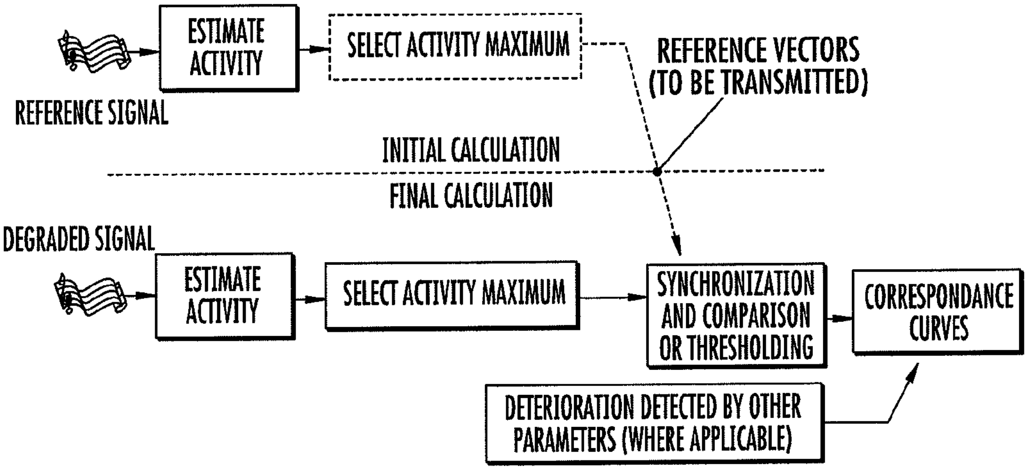

The FIG. 8 diagram depicts the principle of this parameter.

As for the preceding parameter, the advantage of this parameter is that it is possible to achieve detection with no reference.

The reduced complexity and the low bit rate needed to transport the reference, limited to one value, i.e. to a bit rate of 1.5 kbit/s for 1024 signal samples sampled at 48 kHz (or even to one bit using a threshold, i.e. a bit rate of 47 bit/s) are also benefits.

The following method evaluates the minimum of the signal spectrum to locate deterioration.

It mainly useful for detecting "impulsive" deterioration. It is important to note that most of the deterioration that occurs when transmitting an audio signal is of this type, very localized in time and very spread out in frequency. Accordingly, by treating it like wideband white noise in the signal, of very short duration, it is possible to detect it by analyzing the characteristics of the spectrum.

The first step of calculating these parameters is estimating the spectrum of the signal. To this end, the signal is divided into windows comprising blocks of N samples (N=1024 or 2048, for example), with an overlap of N/2 samples. This provides sufficient temporal resolution and analyzes the whole of the signal, taking account of the fact that the use of windowing greatly attenuates the influence of the edges of the time windows.

It also means that the calculation time at the installation stage is not excessively penalized. A fast Fourier transform is then used to change to the frequency domain.

The occurrence of deterioration raises the minimum of the spectrum because of the introduction of wideband white noise into all the frequency components of the spectrum. This is the basic principle behind the development of this parameter, which is simple to calculate using the following formula, in which $x_i$ are the N components of the spectrum X in dB (obtained by remote calculation):

$$\text{MinSpe} = \min(x_i) \text{ for } 1 \le i \le N \tag{13}$$

In the case of methods using a reference, simple comparison after synchronizing the values obtained from the reference and from the degraded signal is generally insufficient to detect deterioration, because of the high variation of the minima obtained with a non-degraded signal.

Comparison must therefore be carried out by blocks of M values and in accordance with the following principle: for each block, only the maximum of the M minima obtained from the reference is retained, and provides a reference value for the initial noise level for the block. This value is compared to the M minima obtained from the degraded signal.

By retaining only the times at which the minima are increased, it is possible to detect the times at which noise is added to the signal.

The distance obtained for each moment $\underline{t}$ is therefore:

$$d(t) = \max\left\{\min_{i \in N}(x_{d,i}(t)) - \max_{k \in M}\left[\min_{i \in N}{}_k (x_{r,i}(t))\right], 0\right\} \tag{14}$$

where:

$x_{r,i}$ is the $i^{th}$ component of the N components of the spectrum obtained from the reference, $x_{d,i}$ is the $i^{th}$ component of the N components of the spectrum obtained from the degraded signal, and $\min_k$ is the $k^{th}$ minimum of the M minima of the block concerned.

If the reference is not available, it is possible to use a mean value of the minima of the spectrum obtained previously by the algorithm. The remainder of the comparison is then effected in the same way.

As in the preceding situations, correspondence curves may be used by integrating the deterioration detected using this parameter with other deterioration to obtain a perceived measurement.

Figure 9:
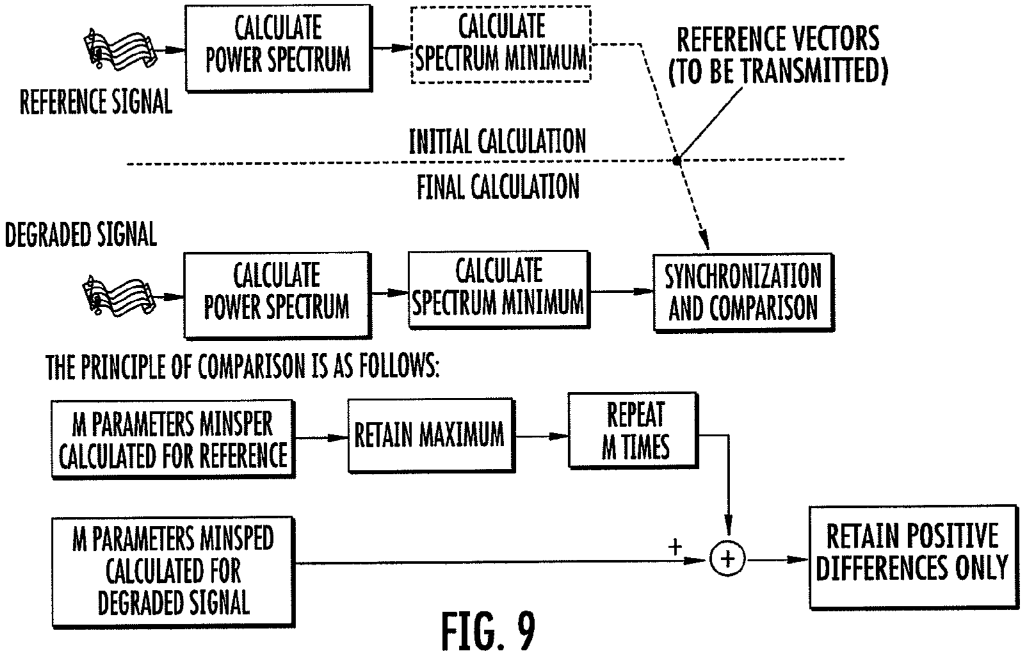

The two diagrams in FIG. 9 summarize the method.

Once again, the main advantage of these parameters is the ability to obtain measurements with no reference. Another benefit is the bit rate needed to transfer the reference. This reduces the reference to one real number and even one integer, i.e. a bit rate of at most 1.5 kbit/s for N signal samples (N=1024, for example). The reduced complexity of the algorithm is also a benefit.

In the next method, which analyses spectral flattening, two parameters $SF_1$ and $SF_2$ are used to estimate the "flattening" of the spectrum, for which the expression "statistical flattening" is sometimes used. These parameters evaluate the shape of the spectrum and its evolution along the sequence under study. If broadband noise appears in the signal, a continuous white noise type component causes flattening of the spectrum.

Parameter $SF_1$

When deterioration occurs, the components that had values close to zero before will have non-negligible values. The product of the spectrum components will therefore be greatly increased, whereas their sum will vary only a little. To exploit this, the spectrum flattening estimation parameter $SF_1$ is calculated from the following formula, in which X is the spectrum of the signal and $x_i$ represents the components of the spectrum:

$$SF_1 = 10.\log 10\left(\frac{\text{Arithmetic Mean}(X)}{GeometricMean(X)}\right) = 10.\log 10\left(\frac{\frac{1}{N}\sum_{i=1}^{N} x_i}{N\sqrt{\sum_{i=1}^{N} x_i}}\right) \quad (15)$$

This parameter is calculated in the same way for the reference and for the degraded signal. It is then possible to estimate the inserted white noise level, and consequently the deterioration, by means of a comparison.

Parameter $SF_2$

The statistical flattening coefficient known as "kurtosis" or "concentration" is used to calculate this parameter. The estimate is based on $2^{nd}$ and $4^{th}$ order centered moments. These enable the shape of the spectrum to be estimated relative to a normal distribution (in the statistical sense).

The calculation corresponds to the ratio of the $4^{th}$ order centered moment and the $2^{nd}$ order centered moment (variance) to the square of the coefficients of the spectrum. The formula used is as follows:

$$SF_2 = \frac{m_4(X)}{m_2^2(X)} = \frac{}{\delta^4} = N\cdot\frac{\sum_{i=1}^{N}(x_i-\overline{X})^4}{\left(\sum_{i=1}^{N}(x_i-\overline{X})^2\right)^2} \quad (16)$$

with centered moments $m_k$ defined by the equation:

$$m_k = \frac{\sum_{i=1}^{N}(x_i-\overline{X})^k}{N} \quad (17)$$

in which $\overline{X}$ is the arithmetic mean of the N components $x_i$ of the spectrum X in dB.

As with the parameter $SF_1$, the higher the value obtained, the more concentrated the signal and the less noise there is in the signal. The latter is calculated for the reference and for the degraded signal. The inserted white noise level is estimated by comparison.

Figure 10:
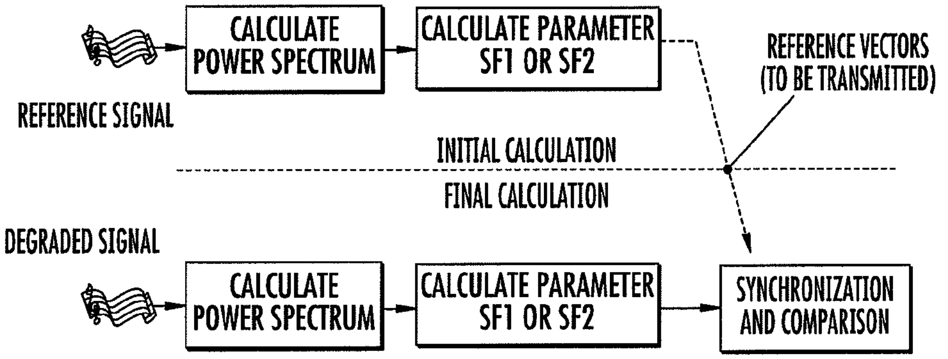

The FIG. 10 diagram depicts this principle, which is valid for both the above parameters.

In the case of comparison with the reference, a single distance of the difference or other type is sufficient for detecting deterioration. If no reference is available, it is necessary to look for deterioration by detecting peaks in the variation of the parameters. This may be done using the standard grey level mathematical morphology technique (erosions and expansions) used in the image processing field.

The advantages and limitations of these parameters are identical to those of the preceding parameters: the necessary bit rate is limited and using no reference is possible, as is using correspondence curves to estimate the perceived magnitude of the deterioration.

In the context of monitoring a digital television broadcast network, the reference audio signal corresponds to the signal at the input of the broadcast network. The reference parameters are calculated for this signal and then sent over a dedicated channel to the required measurement point, at which the same parameters, needed for the comparison for establishing reduced reference measurements, are calculated. Measurements with no reference are also calculated. If the reference parameters are not available (not present, erroneous, etc.), these measurements are sufficient for detecting more serious errors. The subsystems shown in dashed line in FIG. 11 are then no longer used.

The measurements obtained with no reference and the reduced reference measurements (obtained when it has been possible to calculate them) are used by a model for estimating the magnitude of the deterioration induced by broadcasting the signals.

Figure 11:
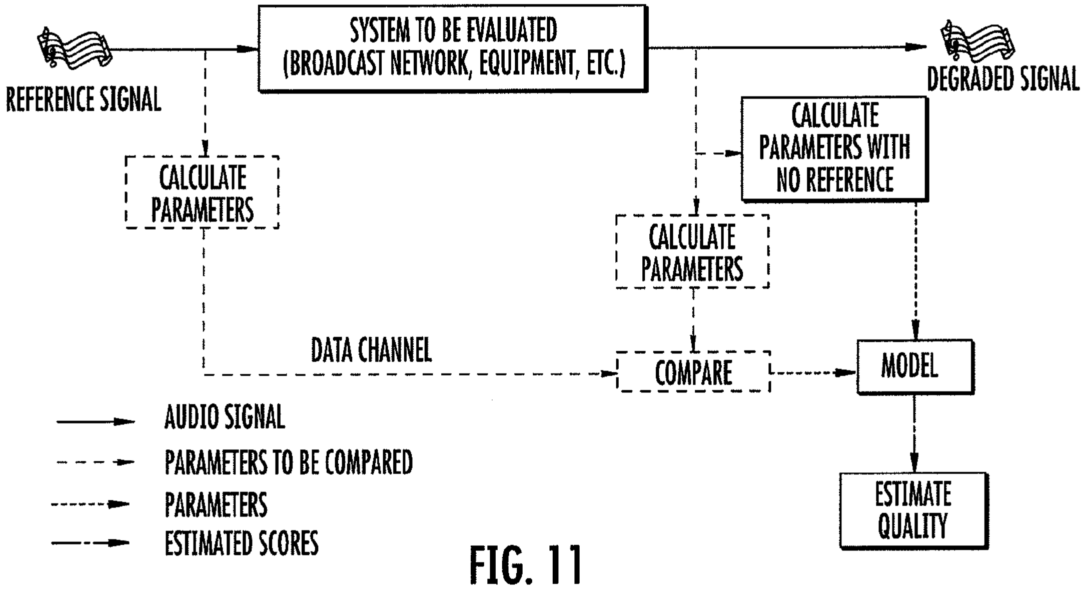
FIGS. 11 and 12 represent an audio quality measuring system of the present invention.

The FIG. 11 diagram summarizes this embodiment:

Thus a plurality of measurement points may be established. Once these estimates of the deterioration have been obtained, it is a simple matter to send them to a network monitoring centre which provides an overview of network performance.

Figure 12:
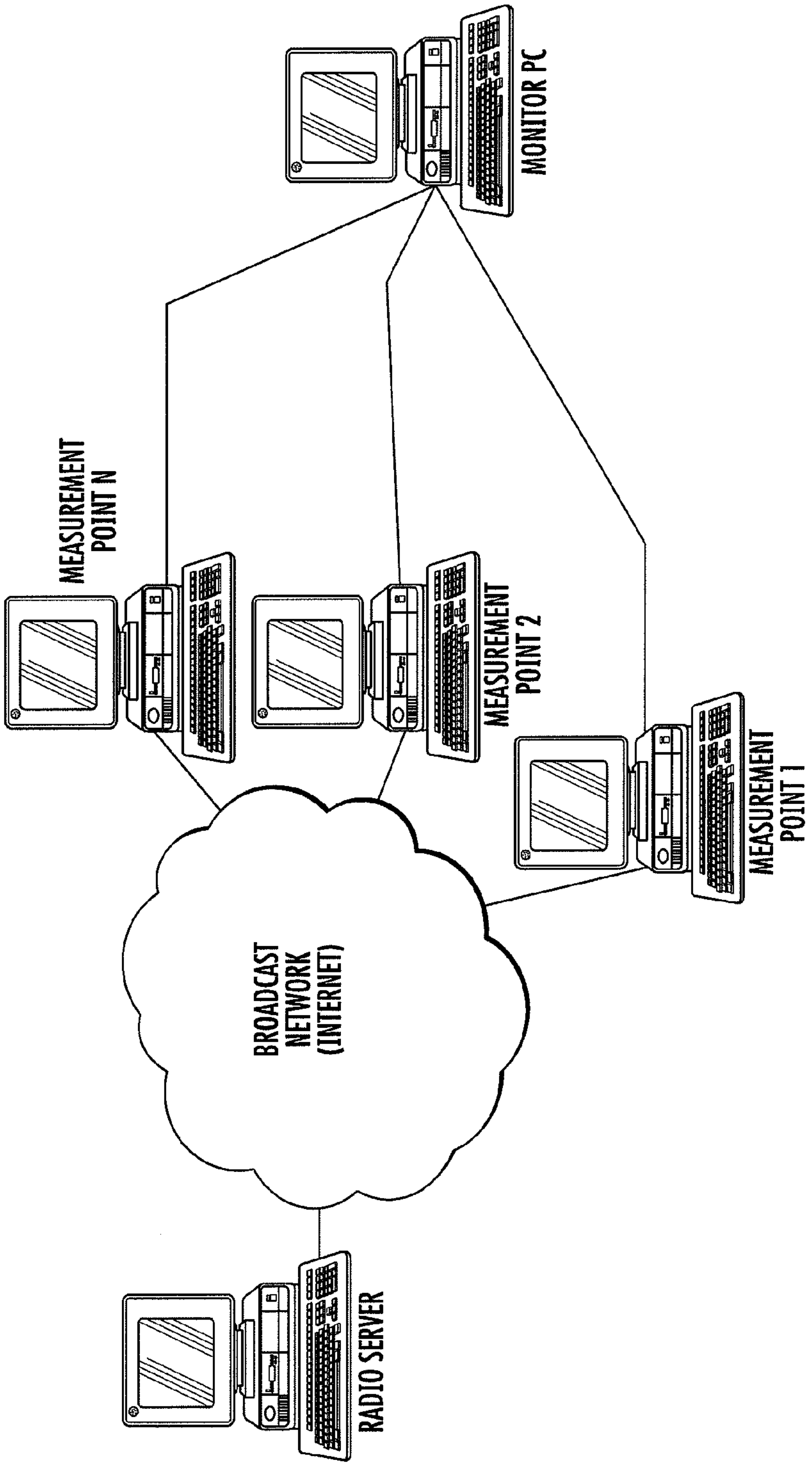

The same diagram as before may then be used to visualize Internet radio broadcast performance (with or without a reference). In this case, the data channel used to transport the reference parameters may be the network itself, in exactly the same way as for returning estimated scores to the monitoring centre. The reference signal corresponds to the signal sent by the server and the degraded signal is that decoded at the chosen measurement point. For example, it is possible to choose the most appropriate server as a function of the connection point by accessing monitoring centre data. The next diagram (FIG. 12) depicts this embodiment in the situation in which reference parameters are sent by the network and the scores obtained are sent over a dedicated channel.

A method of the invention may be applied whenever it is necessary to identify defects in an audio signal transmitted over any broadcast network (cable, satellite, microwave, Internet, DVB, DAB, etc.).

The process proposed uses two classes of methods: reduced reference techniques and techniques with no reference. It is of particular benefit when the bit rate available for transmitting the reference is limited.

Accordingly, the invention is applicable to operating metrology equipment and audio signal distribution network supervisory systems. One of its advantageous features is to combine measurements effected with and without a reference. Finally, the invention conforms to the requirements of quality of service management systems.

What is claimed is:

1. A method of qualitatively evaluating an audio signal, comprising:

calculating, using a measuring system, in real time, in continuous time, and in successive time windows, a quality indicator, wherein said calculating further comprises:

calculating temporal activity of said audio signal in each of said time windows;

calculating a sliding average over N2 successive values of said temporal activity; and retaining a maximum value from M2 successive values of said sliding average and wherein:

said quality indicator is obtained from said audio signal that represents an analog audio signal, said quality indicator is associated with each of said time windows, and said quality indicator comprises a number of elements which is at least one hundred times less than the number of audio samples in a time window, said number being from 1 to 10.

2. The method according to claim 1, wherein said quality indicator comprises said maximum value.

3. The method according to claim 1, wherein said quality indicator consists of said maximum value.

4. The method according to claim 1, wherein said quality indicator comprises a binary value resulting from comparing said maximum value with a given threshold.

5. The method according to claim 1, wherein said quality indicator consists of a binary value resulting from comparing said maximum value with a given threshold.

6. The method according to claim 1, wherein a deterioration indicator is generated by comparing a reference maximum value obtained for a reference audio signal and said maximum value obtained for said audio signal.

7. The method according to claim 6, wherein said reference maximum value is obtained for said reference audio signal by:

calculating reference temporal activity of said reference audio signal in each of said time windows;

calculating a reference sliding average over N2 successive values of said reference temporal activity; and retaining said reference maximum value from M2 successive values of said reference sliding average.

8. The method according to claim 1, wherein said audio signal to be evaluated is transmitted digitally.

9. The method according to claim 1, wherein said audio signal to be evaluated is a digital audio signal to which digital coding has been applied.

10. The method according to claim 9, wherein said digital coding is bit rate reduction coding.

* * * * *